Figure 1:
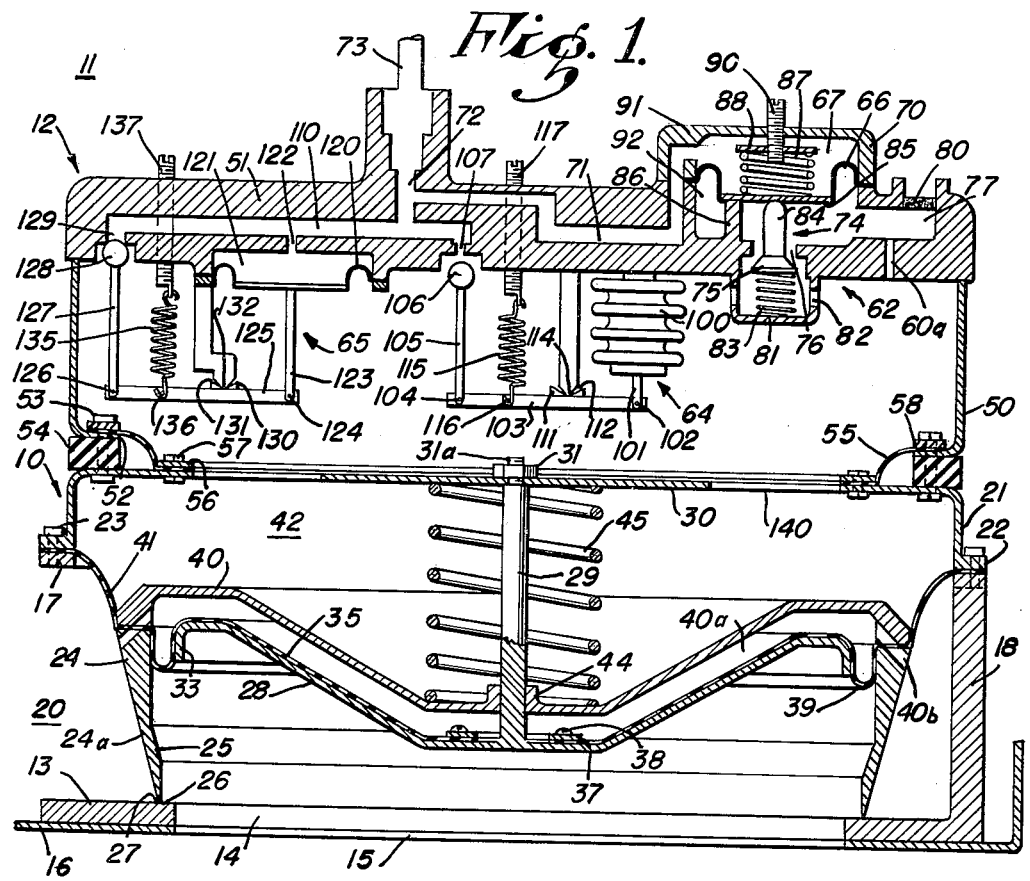

June 6, 1961 R. A. FISCHER 2,986,990
PRESSURE REGULATING MECHANISM
Filed July 8, 1955 2 Sheets-Sheet 1

RICHARD A. FISCHER
INVENTOR.
BY
Attorney

June 6, 1961 R. A. FISCHER 2,986,990
PRESSURE REGULATING MECHANISM
Filed July 8, 1955 2 Sheets-Sheet 2

RICHARD A. FISCHER
INVENTOR.

BY
Attorney

United States Patent Office 2,986,990
Patented June 6, 1961

2,986,990
PRESSURE REGULATING MECHANISM
Richard A. Fischer, Los Angeles, Calif., assignor to The Garrett Corporation, Los Angeles, Calif., a corporation of California
Filed July 8, 1955, Ser. No. 520,680
9 Claims. (Cl. 98—1.5)

This invention relates generally to pressure control mechanisms, and relates more particularly to mechanisms for controlling the pressure within an enclosure.

While the invention has particular utility in connection with pressurizing and ventilating systems for aircraft cabins and the like, and is shown and described herein as embodied in such a system, it is to be understood that its utility is not limited thereto.

In the pressurization of aircraft cabins for flight at altitudes above sea level it is customary to provide a blower or supercharger whereby air for ventilation purposes is taken from the ambient atmosphere, is compressed by the supercharger, and is then delivered to the cabin. In order to regulate the pressure of such ventilation air within the cabin it is customary to provide one or more outflow valves controlled by a master regulator which will maintain the pressure in the cabin in accordance with a predetermined schedule.

For example, assume the aircraft is at a low altitude airport, approximately sea level, and then takes off. As altitude is gained and the ambient atmospheric pressure drops, it is customary to permit the pressure in the cabin to follow atmospheric pressure and be of substantially the same value up to a predetermined altitude, say about 8,000 feet. Cabin pressure is slightly above atmospheric pressure throughout this range due to the pressure drop across the outflow valve opening. Above 8,000 feet and up to a second predetermined altitude an isobaric control maintains cabin pressure at substantially a constant value. Above the second predetermined altitude a differential control maintains the pressure in the cabin at a substantially constant fixed differential with respect to ambient atmosphere.

It has been found desirable in some types of installations to provide a regulator mechanism that may be preset to maintain definite differentials between cabin pressure and ambient atmospheric pressure in several ranges of operation.

It has further been found desirable to provide such a regulator that provides a differential control that may be preset to maintain a definite differential between cabin pressure and ambient atmospheric pressure in a primary differential range below the isobaric range and it is accordingly an object of the present invention to provide a regulator which will have this type of control as well as an isobaric control for the isobaric range and a secondary differential control for the range above the isobaric range.

Such a regulator may be utilized as a master regulator but it has special utility when used as a safety valve in conjunction with a principal regulator in an aircraft having a canopy exposed to the air stream. It is necessary in this type of aircraft to hold the pressures acting on the canopy to a minimum to prevent possible loss of the canopy.

The type of safety valves customarily used in aircraft function under certain conditions to prevent a predetermined differential between cabin air and ambient atmospheric air from being exceeded. For example, should the principal regulator fail closed, that is, fail so that the outflow valve of the principal regulator is held in the closed position, the pressure will build up in the cabin until the diferential between the pressure in the cabin and ambient atmosphere reaches the predetermined value for which the safety valves are set. The safety valves will then function to permit escape of cabin air to atmosphere to prevent the predetermined differential from being exceeded. This predetermined differential will be maintained upon a failure of the principal regulator at any altitude of flight.

The force acting on the canopy due to the differential between cabin pressure and ambient atmospheric pressure is augmented in flight by the negative pressure developed on the upper surface of the canopy by the flow of air over the canopy. This negative pressure, while of little magnitude in the upper ranges of flight, is of considerable magnitude during flight at low altitudes. In flight below the isobaric range, the combined force due to the negative pressure acting on the upper surface of the canopy and the pressure differential acting across the canopy create a hazardous condition which may result in the loss of the canopy.

It is an object of the present invention to relieve this hazardous condition by utilizing the present regulating mechanism as a safety valve in conjunction with the principal regulator to prevent the build up of a large pressure differential between cabin and ambient atmosphere below the isobaric range.

It is another object of the invention to provide a regulator mechanism of the character described that is relatively simple in construction and effective in operation.

The characteristics and advantages of the invention are further sufficiently referred to in connection with the following detailed description of the accompanying drawings, which represent one embodiment. After considering this example, skilled persons will understand that many variations may be made without departing from the principles disclosed, and we contemplate the employment of any structures, elements, or modes of operation that are properly within the scope of the appended claims.

Figure 2:
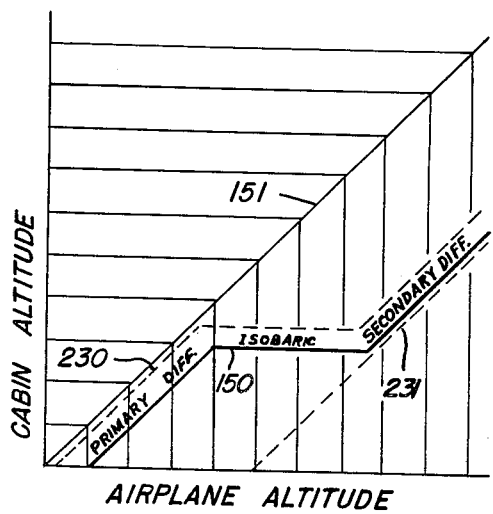
Figure 3:
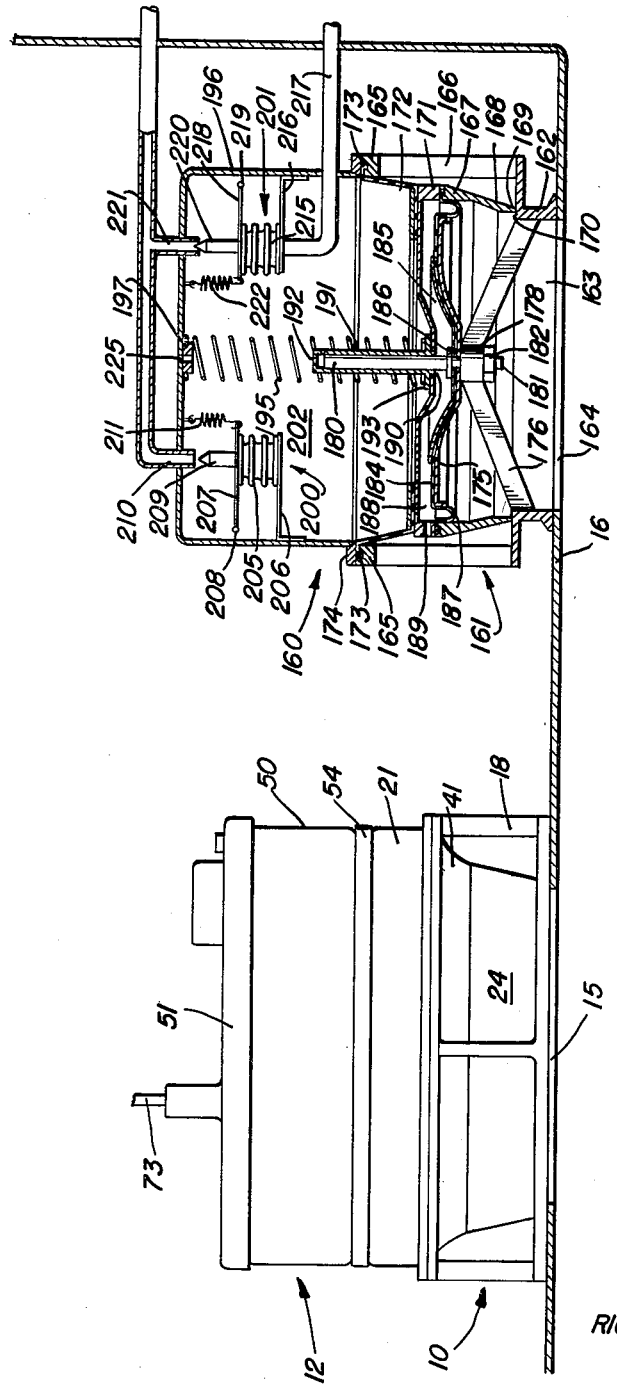

Referring to the drawings, which are for illustrative purposes only:

FIG. 1 is a diagrammatic or schematic view in section showing a regulating mechanism embodying the present invention;

FIG. 2 is a graph showing the flight schedule of the principal regulator system, the flight schedule of the present regulator, and the pressure curve of the usual safety relief valve system, all as related to ambient atmosphere; and FIG. 3 is a schematic view showing a principal regulator in section and as installed in an aircraft cabin, and a regulator embodying the present invention installed in said cabin as a safety valve in connection with the principal regulator.

Referring first to FIG. 1, there is shown an outflow valve, indicated generally at 10, for an enclosure or aircraft cabin 11, and a regulator mechanism, indicated generally at 12 for controlling said outflow valve. The valve and regulator mechanisms are shown here as a unitary assembly although the regulator may be located remotely from the outflow valve.

Outflow valve 10 includes a base 13 having an outflow opening 14 in register with an opening 15 in a wall 16 of the aircraft cabin. The base 13 is connected with a body portion 17 of the outflow valve by struts 18 which are annularly spaced apart to provide openings 20 for the flow of air as will be more particularly described hereinafter. Body portion 17 of the outflow valve is provided with a shallow inverted cup-shaped cover 21 having a peripheral flange 22 secured to the body portion 17 by any suitable means such as screws 23.

There is an outflow valve member 24 for controlling the flow of air through the opening 14, said valve member being generally cylindrical but being provided with a frusto-conical portion having an inwardly tapering surface 25 and a relatively sharp edge 26 engageable with a valve seat 27. Disposed within the valve member 24 is a baffle 28 which is of smaller diameter than the inside diameter of the upper end of the valve member 24 within which said baffle is disposed. Means for supporting the baffle, which is axially arranged with respect to the valve member 24, comprises a stem 29 having its upper end, as shown diagrammatically in FIG. 1, depending from the top wall 30 of said cover 21. The stem 29 is secured to wall 30 by a nut 31 on an externally threaded, reduced diameter portion 31a at the upper end of said stem.

At the outer peripheral edge the baffle has a downturned portion 33 and a flexible diaphragm 35 is adapted to normally rest on the top surface of said baffle. There is a central opening in the diaphragm 35 for reception of the stem 29 and in order to secure the central area of said diaphragm there is provided a retainer 37 which is secured to the baffle by screws 38. The diaphragm 35 extends outwardly of the baffle in a convolution 39 and is clamped to the upper end of the valve member 24 by means of a valve cap 40 secured to said valve member 24 by any suitable means such as screws, not shown. A portion 41 of the diaphragm 35 extends outwardly of the valve member and is functionally different from the rest of the diaphragm. A peripheral edge portion of the portion 41 is clamped between the body 17 and the flange 22 by said screws 23.

Valve cap 40 is spaced upwardly of the baffle 28 and is provided with the same general configuration as said baffle. Centrally the cap 40 is provided with an axially arranged boss 44 with an axial opening therethrough in which is received the stem 29 on which said boss is operable, said stem serving as a guide for the cap and hence the movable outflow valve assembly. Portion 41 of the diaphragm 35 and the outflow valve assembly, particularly the cap 40, comprises a movable pressure responsive or sensitive control element. This pressure sensitive control element comprises one wall of an operating pressure chamber 42, the cover 21 of the outflow valve defining other portions of said chamber 42.

A relatively light coil spring 45 is disposed about the stem 29 for urging the cover, and hence the valve member 24, in the closing direction, said spring reacting between a central portion of the cap 40 and the top wall 30 of the cover.

Regulator 12 comprises a body portion 50 closed at its upper end by head plate 51. The opposite end of the body 50 has an inturned flange 52 which is secured to the top wall 30 of the cover by any suitable means such as screws or bolts 53, there being a ring 54 of resilient material interposed between said flange 52 and top wall 30 which serves as a vibration dampener which insulates the regulator 12 from vibrations which might otherwise be transmitted thereto from the outflow valve to which said regulator 12 is mounted. A flexible annular boot 55 provides a seal between the top wall 30 of the cover of the outflow valve and the body 50 of the regulating mechanism. The inner portion of boot 55 is secured to the wall 30 by a ring 56 held to said wall by screws 57 or the like. A peripheral portion of the boot is clamped between the flange 52 and a ring 58, said ring being secured by means of the screws 53.

Body 50, boot 55, wall 30 and head plate 51 define a control pressure chamber 60 the pressure of which is controlled in the flight range up to the isobaric range by a primary differential control indicated generally at 62. In the isobaric range pressure in the chamber 60 is controlled by an isobaric control, indicated generally at 64. Above the isobaric range there is a second differential range which will be termed the secondary differential range and the pressure in the control chamber is controlled in the latter range by a secondary differential, indicated generally at 65.

The primary differential control 62 comprises a differential pressure responsive means or diaphragm 66 subjected on one side to cabin pressure. The opposite side of said diaphragm is subjected to the pressure in a chamber 67 defined by a cover 70 which clamps a peripheral portion of the diaphragm 66 to the head plate 51. Chamber 67 is connected with ambient atmosphere by means of a passage 71 connected with a passage 72 which in turn has a connection 73 with ambient atmosphere. A poppet valve, indicated generally at 74, has a movable valve portion 75 which controls an orifice 76 between a passage 77 and chamber 60. The passage 77 is connected with the cabin and has a filter 80 therein. Valve 74 is provided with a valve cage 81 having openings 82 therein for the passage of air from the interior of said cage to the chamber 60. A spring 83 urges the valve 74 in the closing direction, and there is a valve stem 84 provided for valve member 75 which is adapted to be engaged by a plate 85 carried centrally of the diaphragm 66 and limited in its movement toward the valve 74 by stops 86. A spring 87 reacts between the plate 85 and a spring retainer 88 to urge the plate 85 and diaphragm 66 in a direction to effect opening of the valve 74. Spring retainer 88 is operably disposed on an adjusting screw 90 threadably received in an opening provided therefor in end wall 91 of the cover 70. It is to be noted that the side of the diaphragm 66 opposite chamber 67 is exposed to cabin pressure which is transmitted through the passage 77 and into an enlarged portion 92 thereof beneath said diaphragm and plate 85.

The isobaric control 64 includes an evacuated bellows 100 which is responsive to the absolute pressure in chamber 60. Bellows 100 has one end connected to the head plate 51, the opposite end of said bellows being provided with a stem 101 having a pivotal connection 102 with one end of a lever 103. The opposite end of said lever has a pivotal connection 104 with a valve stem 105 of a valve 106 which controls a restricted orifice 107 connected with ambient atmosphere through passages 110, 72 and conduit 73. A fulcrum member 111 is provided with a recess 112 for reception of a fixed pivot member 114 which is attached to the head plate 51. The pivot point for the lever 103 is intermediate the ends thereof and a spring 115 is connected at 116 to said lever between the pivotal point thereof and the pivot 104. The opposite end of the spring 115 is connected to an attaching screw 117 for varying the effective force of said spring with respect to the bellows 100.

The secondary differential control 65 includes a differential pressure responsive member or diaphragm 120 subjected on one side to pressure in the control chamber 60 and on the opposite side to pressure in a chamber 121 having a restricted connection 122 with passage 110 so that said chamber 121 is connected with ambient atmosphere and the chamber side of diaphragm 120 is therefore subjected to ambient atmospheric pressure. Diaphragm 120 is provided with a rod 123 having a pivotal connection 124 with one end of a lever 125. The opposite end of lever 125 is pivotally connected at 126 with a valve stem 127 carrying a valve member 128 which controls the passage 129 connected with the passage 110 so the escape of air from the chamber to atmosphere is controlled by said valve 128 as well as valve 106. Lever 125 is provided with a fulcrum member 130 which is recessed at 131 for reception of a fixed pivot member 132 attached to the head plate 51. Valve 128 is urged in the closing direction by a spring 135 having one end connected at 136 to the lever 125 between the pivotal point of said lever and the pivot 126. The opposite end of spring 135 is operably connected to an adjusting screw 137 which is adapted to vary the effective force of said spring 135. Air from a source of higher pressure, shown as being the aircraft cabin, is admitted to the control pressure chamber 60 by way of a bleed passage or opening 60a connected with the passage 77.

Before describing in detail the operation of the regulator 12 a brief description of the operation of the outflow valve mechanism 10 will be made.

Air pressure within the operating chamber 42, together with the pressure of the spring 45 acting on the valve cap 40 urges the movable valve assembly in a direction tending to close the valve 24.

The operating pressure in chamber 42 is substantially the same as the control pressure in the control pressure chamber 60, said chambers 42 and 60 being connected together by openings 140 in the end wall 30 of cover 21 so that the outflow valve is controlled in accordance with said control pressure. Thus, the pressure in chambers 42 and 60 is effective on one side of the diaphragm 41 and the valve cap 40 to urge the valve member 24 in the closing direction. At the same time said valve member is urged in the opening direction by cabin pressure acting on the opposite side of diaphragm 41 and on the opposite side of said cap 40, said cabin pressure being present in the chamber 40a between said cap 40 and diaphragm 35 when the latter is in the normal position as shown in FIG. 1. This is due to the fact that cabin pressure is transmitted to the chamber 40a through a series of openings 40b in the upper portion of the valve member 24, in the valve cap 40 and that portion of the diaphragm clamped between said valve member and cap.

It will also be noted that the outer side 24a of the frusto-conical part of the valve member 24 is also exposed to cabin pressure urging the valve assembly in the valve opening direction. The outer portion of the upper side of the convolution 39 of the diaphragm 35 is subjected to cabin pressure which prevails in chamber 40a, urging the valve member in the closing direction.

As cabin pressure is higher than atmospheric pressure under normal conditions, the diaphragm 35 is pressed against the adjacent side of the baffle 28, as shown in FIG. 1. The baffle may be termed a wall and the diaphragm 35 may be considered a movable barrier which moves from the above described position to a position whereat it engages the underside of the cap 40. This action occurs under various predetermined pressure conditions and a complete description thereof will be found in the patent to Jensen, No. 2,672,086, for a Safety Valve, said patent being issued March 16, 1954.

The outer side of the convoluted part 39 of the diaphragm 35 is exposed to atmospheric pressure, which is present in the pocket defined by the baffle 28 and valve member 24, said part spanning the space between the valve member 24 and the adjacent part of the baffle 28.

The pressure of the atmospheric air or fluid against the outer side of the convolution 39 exerts a force transferred by the outer portion of the convolution to the valve assembly or pressure responsive means and tends to move the same in a direction to open the valve. The frusto-conical portion 25 of the valve member 24, being of smaller diameter at its end nearest the valve seat 27, provides an area or shoulder on the inner side thereof against which atmospheric pressure in said pocket is exerted in a direction tending to close the valve. As these areas which are exposed to atmospheric pressure are substantially equal the valve assembly or pressure responsive means is balanced with respect to atmospheric pressure so that the valve will not be moved thereby toward open or closed position.

Referring to FIG. 2, the curve 150 shows the flight schedule which the present mechanism will maintain, and the function of this mechanism to maintain said flight schedule is as follows:

When the plane is operating below the isobaric range the bellows 100 will be contracted and the valve 106 of the isobaric control 64 will be held in the open position. The differential between the pressure in the control chamber 60 and ambient pressure in the chamber 121 of the secondary differential control 65 will not be sufficient at this time to effect movement of the secondary differential diaphragm 120 so that the metering valve 128 of the secondary differential control will be held in the closed position by the force of spring 135. At this time spring 87 of the primary differential control 62 will hold the plate 85 against the stop 86 so that the metering valve 75 of said primary differential control will be held in the open position. However, when the differential between cabin pressure exerted on one side of the diaphragm 66 and ambient pressure in chamber 67 reaches the predetermined value of the setting of the primary differential control, diaphragm 66 will move upwardly and allow spring 83 to effect closing movement of the valve 75.

Inasmuch as the area of the orifice 76 is larger than the area of the orifice 107 the pressure drop across orifice 107 when valve 75 is in the open position will be considerably greater than that across orifice 76 and the pressure in the control head will therefore be substantially the same as cabin pressure. When the differential of pressure between that in the control chamber 60 and ambient pressure in the chamber 67 reaches the predetermined setting of the primary differential control, this differential of pressure acting across the diaphragm 66 will effect closing movement of the metering valve 75 and regulate the inflow of air into the control chamber 60 through the orifice 76 so as to maintain control chamber pressure, and consequently cabin pressure, at the preset constant differential above ambient atmospheric pressure, the ambient atmospheric pressure curve being indicated at 151 on the chart of Fig. 2.

As the plane continues to gain altitude in the primary differential range there is continuing decrease of pressure in the control pressure chamber 60 and as the isobaric level is approached pressure in said chamber has dropped sufficiently to cause the evacuated belows 100 of the isobaric control 64 to expand and move the valve 106 in the closing direction to regulate the flow of air from the control chamber 60 to atmosphere so as to maintain the pressure in said chamber at a substantially constant value throughout the isobaric range. At this time, that is in the isobaric range, the differential between the pressure in the cabin and the pressure of ambient atmosphere in the chamber 67 exceeds the predetermined setting of the primary differential control so that said differential of pressure between that in the cabin and that in chamber 67 causes the diaphragm 66 to move in the valve closing direction so that the spring 83 of the valve 75 will effect closing of said valve. During the isobaric and secondary differential range of operation cabin air will flow into the control pressure chamber only through the restricted orifice 60a, said restricted orifice 60a being smaller in size than either the restricted orifice 107 or passage 129.

When the upper limit of the isobaric range is reached, the differential pressure between that in the control chamber 60 and ambient atmosphere reaches the predetermined value for which the secondary differential control has been set, and this differential of pressure, acting on the diaphragm 120 of the secondary differential control 65 will effect movement of the metering valve 128 in the opening direction. With the opening of the valve 128 the isobaric metering valve 106 closes and the secondary differential control 65 regulates the flow of air from the control chamber 60 to maintain a constant differential pressure between that in said control chamber and hence, in the cabin, and ambient atmosphere.

It is to be noted that in the primary differential range there is a modulated inflow and a fixed inflow to the chamber 60 from a region of higher pressure, and a fixed outflow from said chamber to a region of lower pressure, such as ambient atmosphere. In the isobaric range there is a fixed inflow of air to the chamber 60 and a modulated outflow. In the secondary differential range there is a fixed inflow of air to the chamber 60 and a modulated outflow.

It is to be noted that while the diaphragm 66 of the primary differential control is subjected on the side opposite chamber 67 to cabin pressure said side could be subjected to control chamber pressure and the spring adjusted to give the same pressure schedule as that provided by the control 62 shown in FIG. 1.

In FIG. 3 there is shown a principal regulator, indicated generally at 160, which includes an outflow valve, indicated generally at 161, and having regulating means within the control pressure chamber thereof, which will be more particularly described hereinafter.

The outflow valve mechanism 161 is of similar character to the outflow valve 10, which has already been described. However, a brief description of outflow valve 161 will be given here. There is a base 162 having opening 163 which is in register with an opening 164 in the cabin wall 16. There is also a body portion 165 which is connected to the base 162 by means of struts 166 spaced annularly apart. There is a movable outflow valve member 167 which is generally cylindrical in shape, but includes a frusto-conical portion 168 terminating in a relatively sharp edge 169 engageable with an outflow valve seat 170. Valve member 167 is provided with a cover 171 which closes the upper end thereof and to which an annular flexible diaphragm 172 is secured. Diaphragm 172 has a peripheral bead 173 received in a groove provided therefor in the body 165 and said bead is secured in said groove by means of an annular ring 174 attached to the body 165 by any suitable means, not shown.

Within the valve member 167 is a baffle 175 supported by a spider 176 which is attached to the base 162. The arms of the spider 176 are inclined upwardly and joined at a hub 178 having an opening therethrough which is on the axis of said valve member 167. There is a rod 180 arranged axially of said hub 178 and said rod is provided with a reduced externally threaded end portion 181 which extends through an axial opening provided in said baffle 175 and through the opening in said hub, there being a nut 182 on said reduced diameter portion for securing the rod in position.

Disposed on the baffle is a flexible diaphragm or sealing means 184 which has a central opening for reception of the reduced diameter portion 181, and securing a central area of said diaphragm 184 is a retainer plate 185 which also has a central opening for reception of said reduced diameter portion 181. A flange 186 on said rod 180 engages the upper surface of said retainer 185 so that the various parts on said reduced diameter portion 181 are clamped between said flange and said nut 182. Diaphragm 184 has a convoluted portion 187 adjacent the periphery thereof and a peripheral portion of said diaphragm is clamped between said valve member 167 and cover 171. The chamber 188 between cover 171 and the diaphragm 184, when the diaphragm is disposed on said baffle 175, is connected with the cabin by means of a series of ports 189 in the cover 171 so that cabin pressure prevails in said chamber 188.

Cover 171 is provided with an axial opening for reception of the free end 190 of a sleeve 191 slidable on the rod 180, there being a pressure relief port 192 in the closed end of said sleeve. Sleeve 191 is provided with a flange 193, which rests on the upper surface of the cover 171 whereby said sleeve may be attached to said cover by screws, rivets, or other suitable means, not shown. A relatively light spring 195 reacts between the upper wall of the cover 171 and the end wall of the cap 196 which is secured to the body of the outflow valve mechanism. The spring 195 has its outer end held against displacement by a spring retainer 197 while the opposite end is disposed about the sleeve 191.

The operation of the outflow valve of the principal regulator is substantially the same as the outflow valve 10 described above, and control of the outflow valve is effected by an isobaric control means, indicated generally at 200, and a differential pressure control means indicated generally at 201. The control means 200 and 201 are both located within a control pressure chamber 202 defined by a generally cup-shaped cap 196, the diaphragm 172 and the cover 171 of the outflow valve member.

The isobaric control 200 comprises an evacuated bellows 205 having one end fixed to a bracket 206 attached to a wall of the cap 196. The opposite end of the bellows 205 is movable and is attached to a lever 207 which is pivoted at 208 and carries a movable valve member or metering pin 209 adapted to control the flow of air from the chamber 202 by way of a conduit 210 leading to a low pressure region such as ambient atmosphere. The free end of lever 207 is urged in a direction to effect closing movement of the metering pin 209 by a spring 211, which has one end attached to the free end of said lever and the opposite end attached to the wall of the cap 196.

The differential control mechanism comprises a differential bellows 215 having one end secured to a bracket 216 attached to a wall of the cap 196. The interior of bellows 215 is connected to ambient atmosphere by means of a conduit 217 while the exterior of said bellows is subjected to the pressure in the control chamber 202. The opposite end of bellows 215 is secured to a lever 218 having one end pivoted at 219, said lever having a movable valve member or metering pin 220 secured thereto for controlling the outflow of air through a conduit 221 connected with the conduit 210. A spring 222 has one end connected to the free end of lever 218 and the other end connected to a wall of the cap 196, said spring urging the lever in a direction to effect closing movement of the valve member 220. It is to be noted that the isobaric control 200 and the differential control 201 control the escape of air from the control pressure chamber 202. Air is admitted to said chamber by means of a bleed 225 from a region of higher pressure which is shown as the aircraft cabin.

The isobaric control 200 and differential control 201 of the principal regulator 160 function to control the pressure in chamber 202, and hence in the cabin in accordance with the pressure schedule shown by the curve 230. While these controls function substantially in the manner described in the Kemper Patent No. 2,463,491 for A Cabin Pressure Regulator, issued March 1, 1949, a brief description of the operation of these controls will be given here.

In the primary differential range, the range below the isobaric range, the pressure in the chamber 202, and hence in the cabin will be substantially the same as ambient atmospheric pressure except that there will be a slight differential between chamber and cabin pressure and ambient atmospheric pressure, due to the pressure drop across the outflow valve opening which will cause cabin pressure to be maintained slightly above atmospheric pressure. In the isobaric range pressure in the chamber 202, and hence in the cabin, will be maintained at substantially a constant value. In the secondary differential range, which is the range above the isobaric range, the pressure in chamber 202 and in the cabin will be maintained by the differential control 201 at a substantially fixed differential pressure with respect to ambient atmospheric pressure. It will be noted from the graph of FIG. 2 that the regultor 12, when used as a safety mechanism in connection with a principal regulator system, is set for a somewhat higher pressure schedule as is clearly brought out by comparing the pressure curve 150 of the regulator 12 with the pressure curve 230 of the principal regulator, although it should also be noted that these curves are parallel to each other.

The dotted line 231 represents the pressure curve of the usual pressure relief or safety valve and with this type of safety valve a failure of the principal regulator in the isobaric range would result in a rapid pressure increase in the cabin because the supercharger continually supplies air under pressure to the cabin, there being no relief of the pressure in said range until the pressure has increased to a value for which the pressure relief valve has been set. However, with the use of the present mechanism having the control arrangement of the regulator 12 failure of the principal regulator in the primary differential range will result in but a small increase in cabin pressure as clearly shown by the comparison of the curve 230 with the curve 150 in the primary differential range. From the curves of 150 and 230 of FIG. 2 it will be apparent that upon failure of the principal regulator the present mechanism having the arrangement of the regulator 12 will take over control of cabin pressure with but a comparatively slight change of pressure as compared with the pressure schedule of said principal regulator.

I claim:

1. In mechanism for controlling the pressure in an enclosure: walls defining a control pressure chamber; a movable pressure sensitive element subjected to control pressure on one side and adapted to be subjected to enclosure pressure on the other side; means for controlling the pressure in said chamber in one range of operation, including differential pressure responsive means responsive to the differential of pressure between that externally of said chamber and ambient atmospheric pressure; means for controlling the pressure in said chamber in another range of operation including an absolute pressure responsive device subjected to control chamber pressure; and means for controlling the pressure in said chamber in a third range of operation, including a second differential pressure responsive means responsive to the differential of pressure between that in the control chamber and ambient atmosphere.

2. In mechanism for controlling the pressure in an enclosure: walls defining a control pressure chamber; pressure sensitive control means subjected to control pressure on one side and adapted to be subjected to enclosure pressure on the other side, said means including a pressure sensitive element and a valve for controlling the outflow of air in said enclosure; means for controlling the pressure in said chamber in one range of operation, including differential pressure responsive means responsive to the differential pressure between that in said enclosure and ambient atmospheric pressure; means for controlling the pressure in said chamber in another range of operation, including an absolute pressure responsive device subjected to control chamber pressure; and means controlling the pressure in said chamber in another range of operation, including a second differential pressure responsive means responsive to the differential of pressure between that in the control chamber and ambient atmosphere.

3. In mechanism for controlling the pressure in an enclosure: walls defining a pressure chamber; a movable pressure sensitive control element subjected on one side to the pressure of said chamber and adapted to be subjected to enclosure pressure on its other side; a pair of inlet means for said chamber, one of said inlet means including an orifice of fixed size; a valve member controlling the other of said inlet means; a pair of outlet passages for said chamber, each of said outlet passages being controlled by a movable valve part, and one of said outlet passages including an orifice of fixed size; differential pressure responsive means responsive to the differential of pressure between that in said enclosure and external pressure for controlling said valve member; absolute pressure responsive means controlling one of said movable valve parts; said absolute pressure responsive means being responsive to the pressure of said chamber; and second differential pressure responsive means, responsive to the differential of pressure between that in the control chamber and external pressure for controlling the other movable valve part of said one outlet passage.

4. The invention defined by claim 3 wherein one of said differential pressure responsive means has different response characteristics from those of the other differential pressure responsive means.

5. In mechanism for controlling the pressure in an enclosure: walls defining a control pressure chamber; a movable pressure sensitive control element subjected on one side to the pressure of said chamber and adapted to be subjected to enclosure pressure on the other side; and means for controlling the pressure in said control pressure chamber including an isobaric control means responsive to the pressure in said chamber operable to maintain the pressure at a substantially constant value; a first differential pressure control means responsive to differential of pressures interiorly and exteriorly of said enclosure adapted to maintain a pressure schedule in said enclosure at a predetermined substantially fixed differential pressure with respect to ambient atmospheric pressure below the isobaric range; and a second differential pressure control means responsive to the differential of pressure between that in said chamber and that exteriorly of said enclosure adapted to maintain the pressure in said chamber at a substantially fixed differential with respect to ambient atmosphere in a range above the isobaric range.

6. In mechanism for controlling the pressure in an enclosure: walls defining a control pressure chamber; a movable pressure sensitive control element subjected on one side to the pressure of said chamber and adapted to be subjected to enclosure pressure on its other side; a pair of inlet means for said chamber, one of said inlet means including an orifice of fixed size; a valve controlling the other of said inlet means; a pair of outlet passages for said chamber, each of said outlet passages being controlled by a valve member, and one of said outlet passages including an orifice of fixed size, said orifice being of larger effective size than the first mentioned fixed orifice; absolute pressure responsive means controlling the valve of the outlet passage having the orifice of fixed size; differential pressure responsive means responsive to the differential of pressure between that in said enclosure and external pressure for controlling the valve of said other inlet means; and second differential pressure responsive means, responsive to the differential of pressure between that in the control chamber and external pressure for controlling the valve member of said other outlet passage.

7. In mechanism for controlling the pressure in an enclosure: walls defining a control pressure chamber having inflow passage means including an orifice of fixed size and outflow passage means including an orifice of fixed size; means for controlling the pressure in said chamber including a plurality of pressure responsive means, one of said pressure responsive means being responsive to the differential of pressure between that in said enclosure and ambient atmospheric pressure and including means adapted to provide a modulated inflow through said inflow passage means into said chamber in connection with a fixed outflow through said outflow passage means and a fixed inflow through said orifice of fixed size in said inflow passage means in a primary differential range; another of said pressure responsive means being responsive to pressure in said chamber and including means providing a modulated outflow for said chamber through said outflow passage means in connection with a fixed inflow through said inflow passage means for maintaining the pressure in said chamber at a substantially constant level in an isobaric range above the primary differential range; and another of said pressure responsive means being responsive to the differential of pressure between that in said chamber and ambient atmospheric pressure and including means for controlling the pressure in said chamber in a secondary differential range above said isobaric range by modulating an outflow through said outflow passage means in connection with a fixed inflow through said inflow passage means.

8. In mechanism for controlling the pressure in an enclosure: walls defining a control pressure chamber; inflow and outflow passage means for said chamber, means for controlling the pressure in said chamber including a plurality of pressure responsive means, one of said pressure responsive means being responsive to the differential in pressure between that in said enclosure and ambient atmospheric pressure and including means adapted to provide a modulated inflow through said inflow passage means into said chamber in connection with a fixed outflow through said outflow passage means and a fixed inflow through said inflow passage means in a predetermined differential range; and another of said pressure responsive means being responsive to the differential of pressure between that in said chamber and ambient atmospheric pressure and including means adapted to control the pressure in said chamber in another predetermined differential range by providing a modulated outflow through said outflow passage means in connection with a fixed inflow through said inflow passage means.

9. In mechanism for controlling the pressure in an enclosure: walls defining a control pressure chamber; a movable pressure sensitive element subjected to control pressure on one side and adapted to be subjected to enclosure pressure on the other side; means for controlling the pressure in said chamber in a primary differential range of operation which extends to a predetermined altitude, said means including differential pressure responsive means responsive to the differential of pressure between that externally of said chamber and ambient atmospheric pressure; means for controlling the pressure in said chamber in an isobaric range of operation between said predetermined altitude and a second, higher predetermined altitude, said means maintaining the pressure in said chamber at a substantially constant value; and means for controlling the pressure in said chamber in a secondary differential range of operation extending upwardly from the second predetermined altitude, said means including a second differential pressure responsive means responsive to the differential of pressure between that in the control chamber and ambient atmosphere.

References Cited in the file of this patent

UNITED STATES PATENTS

| | | |
|---|---|---|
| 2,562,684 | Wood | July 31, 1951 |
| 2,578,026 | Taylor | Dec. 11, 1951 |
| 2,620,718 | Price | Dec. 9, 1952 |
| 2,696,153 | Kemper | Dec. 7, 1954 |
| 2,734,442 | Jensen | Feb. 14, 1956 |
| 2,814,241 | Silver | Nov. 26, 1957 |